United States Patent Office 2,727,195
Patented Dec. 13, 1955

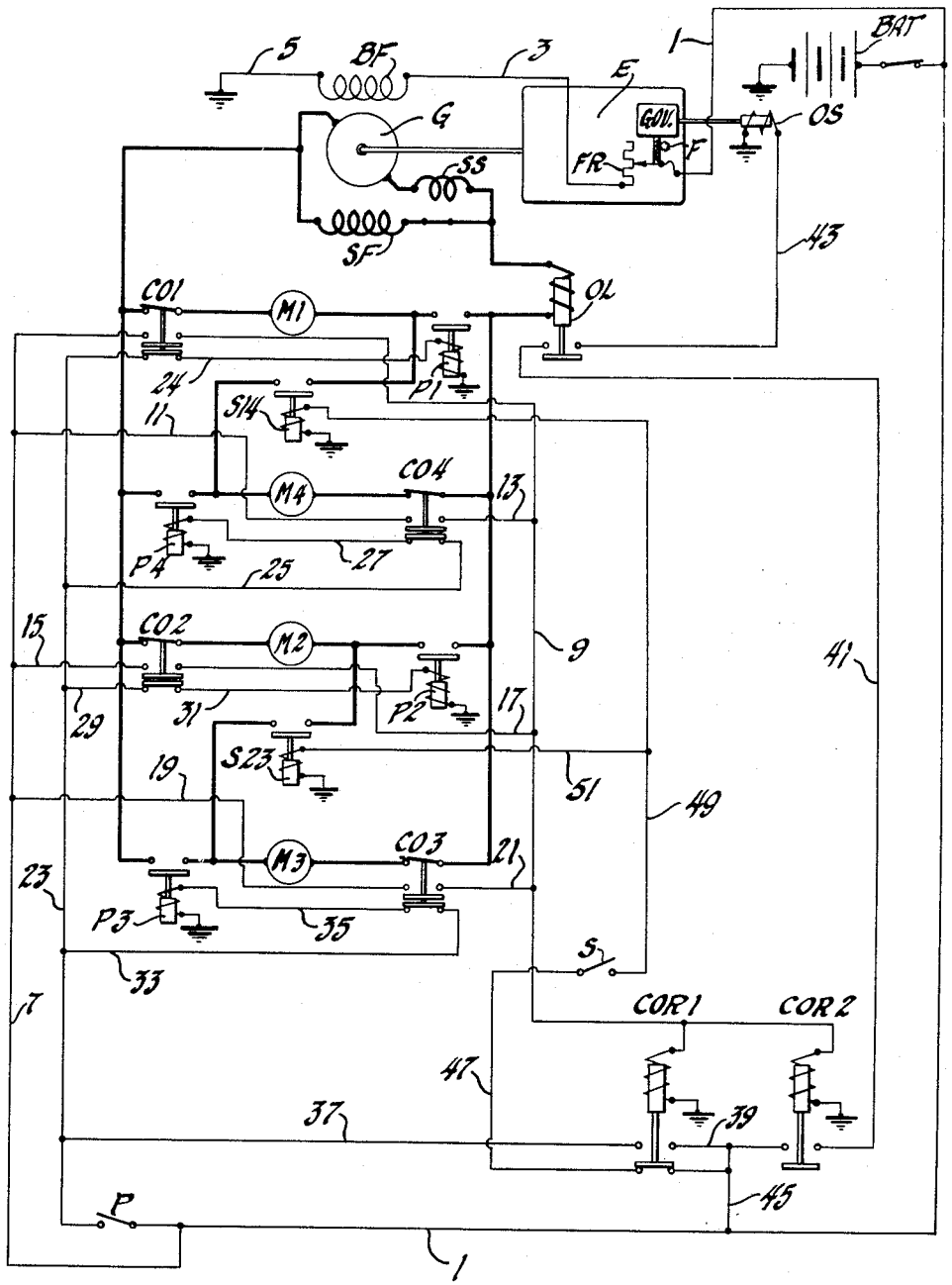

2,727,195

MOTOR CUT-OUT CONTROL

Torsten O. Lillquist, La Grange Park, Ill., assignor to General Motors Corporation, Detroit, Mich., a corporation of Delaware Application July 17, 1951, Serial No. 237,087

9 Claims. (Cl. 318—93)

This invention generally relates to generating electric traction and control systems for locomotives and more particularly to traction motor transition connection and cut-out control means for such systems.

The principal object of the invention is to provide simple traction motor transition connection and cut-out control means in a multitraction motor generating electric traction system for a locomotive to permit continued operation without overloading thereof when a defective traction motor is cut out.

The combined means by which this object is accomplished, together with other novel features thereof will become apparent by reference to the following detailed description and single diagrammatic drawing illustrating one modification of the invention which is particularly adaptable to multi-traction motor Diesel Electric locomotives.

In the drawing, the locomotive power plant includes an electric traction generator G, shown directly connected to and driven by a Diesel Engine E. The power plant is provided with an engine driven governor GOV of conventional type having speed setting means, not shown. The engine fuel regulator F and a generator field rheostat FR are connected to and operated by the governor GOV to maintain the speed, load and power output of the engine and generator power plant at any one of a plurality of constant values depending upon the governor speed setting, in a well known manner.

The engine driven governor GOV is provided with an overriding solenoid OS which, when energized, operates a plunger to override the governor and reduce the power output supplied by the generator G to the traction motors.

The generator G is provided with a shunt connected, shunt field winding SF, a series connected, series field winding SS and a separately excited battery field winding BF. The generator battery field winding BF is connected in series with the field rheostat FR to a battery BAT, having one terminal grounded, by the conductors 1, 3 and 5, the conductor 5 also being shown grounded.

The power plant generator G supplies power through power circuit connections, shown in heavy lines in the drawing, to a plurality of traction motors M1, M2, M3 and M4, of the series type. Each motor is operatively connected in conventional manner to drive separate locomotive traction wheels, not shown. Shown included in the power circuit connections are the generator series field winding SS, the coil of an overload current relay OL having normally open control contacts, the normally open power contacts of series and parallel contactors S14, S23, P1, P2, P3 and P4 and the normally closed power contacts of separate motor cut-out switches CO1, CO2, CO3 and CO4.

Each cut out switch is also provided with a normally open set, and a normally closed set of interlocking and control contacts.

The series and parallel contactors S14, S23, P1, P2, P3 and P4 are provided with coils which are energized by series and parallel control switches S and P to cause sequential closure of the series and parallel contactors in order to cause transition of the motor power connections between a series-parallel and a parallel power circuit relation with respect to the power plant generator G. It will be obvious that the series and parallel control switches S and P may be included in and operated by the conventional manually operable master controller of the locomotive, not shown, which is usually provided to control the governor speed setting means in order to control the power supplied the motors by the engine and generator power plant or these series and parallel control switches S and P may be operated in response to electrical conditions in the series-parallel and parallel traction motor circuits to obtain automatic transition between these circuits in a well known manner.

The interlocking and control contacts of the cut-out switches CO1, CO2, CO3 and CO4, the control contacts of the overload relay OL, the governor overriding solenoid OS, the series and parallel control switches S and P and the coils of the series and parallel contactors S14, S23, P1, P2, P3 and P4 are included in an interlocking and control circuit, shown in lighter lines in the drawing. Also included in this interlocking and control circuit are cut-out and control relays COR1 and COR2 each having a coil and a set of normally open control contacts. The relay COR1 is also provided with a set of normally closed control contacts. The coils and control contacts of the cut-out relays are connected in the interlocking and control circuit and the various conductors comprising this control circuit will now be described in detail.

It will be noted that one terminal of each of the coils of the relays COR1 and COR2, one terminal of the overriding solenoid OS, and one terminal of each of the coils of the series and parallel contactors S14, S23, P1, P2, P3 and P4 are shown grounded. In certain installations however, it is preferable to use positive and negative battery conductors rather than a grounded system, as shown.

The other coil terminals of the cut-out relays COR1 and COR2 are connected in series with the normally open interlocking and control contacts of the cut-out switch CO1 to the battery conductor 1 by means of conductors 7 and 9. The normally open set of interlocking and control contacts of each of the other cut-out switches CO2, CO3 and CO4 are connected in series between the conductors 7 and 9 by the following pairs of conductors; 11 and 13, 15 and 17 and 19 and 21.

The other coil terminal of the parallel contactor P1 is connected in series with the normally closed set of interlocking and control contacts of the cut-out switch CO1, the parallel control switch P and the battery conductor 1, by conductors 23 and 24. The normally closed set of interlocking and control contacts of each of the other cut-out switches CO2, CO3 and CO4 are connected in series with P and conductors 1 and 23 in a similar manner by separate pairs of conductors 25 and 27, 29 and 31 and 33 and 35 extending between the other coil terminal of each of the other parallel contactors P2, P3 and P4 and conductor 23.

The normally open set of contacts of relay COR1 are connected in series with battery conductor 1 and conductor 23 by conductors 45, 39, and 37 so as to bypass or shunt switch P when relay COR1 is energized. The normally open set of contacts of the relay COR2 and the normally open control contacts of the overload relay OL are connected in series between the other terminal of the governor overriding solenoid OS and the battery conductor 1 by conductors 45, 39, 41 and 43. The normally closed set of control contacts of the relay COR1 and the series control switch S are connected in series between the battery conductor 1 and the other terminal of the series contactor S14 by conductors 45, 47 and 49, the conductor 45 being shown connected directly between conductors 1 and 39. A conductor 51 is connected between the conductor 49 and the other coil terminal of the other series contactor S23.

With the above described control means in the normal positions shown the normal procedure for starting and accelerating the locomotive by means of all the traction motors M1, M2, M3 and M4 is to simultaneously increase the speed load and power output of the engine and generator power plant by means of the conventional governor speed setting means and to connect the motors in a high tractive effort, series-parallel, power circuit relation with the generator G by closure of the series control switch S. Closure of the switch S causes energization of the coils of the series contactors S14 and S23 through the normally closed contacts of the cut-out relay COR1 and conductors 1, 45, 47, 49 and 51. This causes closure of the power contacts of the series contactor S14 to connect the motors M1 and M4 in series relation across the generator G and also causes simultaneous closure of the power contacts of the series contactor S23 to likewise connect the motors M2 and M3 in series relation across the generator G and thereby establish the series-parallel motor circuit connection. When the motor and locomotive speeds increase, the back voltages of the motors increase and limit the currents supplied by the generator to the motors and in order to cause operation of the motors and locomotive at higher speeds, the traction motors are then connected in parallel power circuit relation with the generator to reduce the back voltages applied by the motors on the generator. Transition between the series-parallel and parallel motor connections is accomplished by opening the series control switch S and closing the parallel control switch P. Closure of the switch P energizes the coils of each of the parallel contactors P1, P3 and P4 through the conductors 1 and 23 and through the normally closed set of interlocking and control contacts of the cut-out switches CO1, CO2, CO3 and CO4 and conductors 24, 25, 27, 29, 31, 33 and 35. This causes closure of the power contacts of the parallel contactors P1, P2, P3 and P4 to connect each traction motor across the generator G and thus establish the parallel motor circuit connection.

Under abnormal operating conditions, such as when a traction motor develops an electrical ground or short circuit, in order to continue operation of the locomotive the cut-out switch for the defective motor is opened manually either when the locomotive is stopped with the motors disconnected from the generator or moving with the motors connected in series parallel or parallel relation across the generator. This opens the power contacts of the cut-out switch to cut the defective motor out of the power circuit and causes closure of the normally open set and the opening of the normally closed set of control contacts of this cut-out switch. The opening of the normally closed control contacts of any motor cut-out switch, opens the series connection to the coil of the parallel contactor for the motor cut-out, to prevent energization of this contactor coil. Closure of the normally open set of control contacts of any of the cut-out switches CO1, CO2, CO3 or CO4 energizes relays COR1 and COR2. Energization of relay COR1 closes its normally open upper interlock and shunts the parallel control switch P by connecting conductor 23 directly to battery BAT so that energy therefrom does not first have to pass through switch P to energize the power contactors P1 through P4. With conductor 23 directly connected to battery BAT in the aforementioned manner the conductor 24 or other pairs of conductors connected to 23 will energize or continue to energize the coils of the other parallel contactors to connect or maintain the remaining motors, not cut out, in parallel circuit relation depending on whether the motors are in series parallel or parallel at the time the particular cutout switch is opened. These pairs of conductors are 25 and 27, 29 and 31 and 33 and 35. Energization of the coils of both of the relays COR1 and COR2 causes opening of the normally closed set of control contacts of the relay COR1 and closure of the normally open set of control contacts of relay COR2. The closure of these contacts of the relay COR2 sets up a circuit including the normally open control contacts of the overload relay OL and conductors 1, 45, 39, 41 and 43 to the governor overriding solenoid OS to permit energization thereof only upon overloading of the generator G which causes closure of the control contacts of the overload relay OL. As explained when the overriding solenoid OS is energized it moves a plunger to override the governor GOV and cause a prompt reduction in the power output supplied to the remaining motors in the power circuit connected in parallel with the power plant generator G. The opening of the normally closed control contacts of the cut-out relay COR1 opens the connection from the battery BAT to the series control switch comprising the conductors 1, 45 and 47 so that the series contactors S cannot be energized to connect the motors in the series-parallel circuit relation. It will be evident that various other control and interlocking contacts may be added to the cut-out switches and relays to take care of other control mechanism on the locomotive which would be damaged if one or more motors were cut out of the power circuit.

This control system enables operation of a multi-motor diesel electric locomotive with defective motors without damage due to overloading of the remaining motors operating and the engine and generator supplying power to these motors.

I claim:

1. A generator, a plurality of electrical motors in electrical circuit with said generator, and switching means for each motor associated with both sides of each motor operable upon opening thereof to isolate one of said plurality of motors from said generator, said switching means having means operable upon opening thereof to connect the remaining of said plurality of motors in electrical parallel relationship with said generator, said switching means having other means operable upon opening thereof to allow generator current responsive means to reduce the excitation of said generator to prevent overload of said generator with one of said motors isolated therefrom and the remainder of said motors in parallel relationship thereacross.

2. A generator, a plurality of electrical motors in electrical circuit with said generator, and manually controlled switching means for each motor associated with both sides of each motor operable upon opening thereof to isolate one of said plurality of motors from said generator, said switching means having means operable upon opening of said switching means to connect the remaining of said plurality of motors in electrical parallel relationship with said generator, said switching means having other means operable upon opening of said switching means to allow generator current responsive means to reduce the excitation of said generator to prevent overload of said generator with one of said motors isolated therefrom and the remainder of said motors in parallel relationship thereacross.

3. A generator, a plurality of electrical motors, parallel switches associated with one side of each motor and operable to connect one side of each motor in parallel circuit relationship with said generator, switching means associated with the other side of each motor connecting the other side of the associated motor to said generator and operable to disconnect said other side of the associated motor from said generator, said switching means simultaneously being operable upon opening thereof to make the parallel switch for said associated motor inoperative to thereby isolate said associated motor from said generator, said switching means simultaneously being operable upon opening thereof to close and to maintain in closed position the remaining of said parallel switches to thereby connect the remaining of said motors in parallel circuit relation across said generator, and current responsive means responsive to predetermined values of current flow through said generator to de-excite said generator and prevent its overload when one of said plurality of motors is isolated therefrom and the remaining of said motors are connected in parallel circuit relationship thereacross.

4. A generator, a voltage source, a field for said generator in electrical circuit with said voltage source, means to turn said generator, variable resistive means in electrical circuit with said voltage source and said field to vary the strength of said field, a plurality of motors in electrical circuit with said generator, parallel switches associated with one side of each motor and operable to connect said motors in parallel circuit relationship across said generator, switching means associated with the other side of each motor operable upon opening thereof to disconnect said other side of the associated motor from said generator, said switching means simultaneously being operable to place said parallel switch for said associated motor in an inoperative condition to thereby isolate said associated motor from said generator, said switching means simultaneously being operable to close or maintain in closed position the remaining of said parallel switches to thereby connect the remaining of said motors in parallel circuit relation across said generator, and a current responsive means responsive to predetermined values of current flow through said generator operable to increase said variable resistive means and reduce the field strength of said generator thereby preventing its overload when one of said plurality of motors is isolated therefrom and the remaining of said motors are connected in parallel circuit relationship thereacross.

5. A generator, a voltage source, a field for said generator in electrical circuit with said voltage source, means to turn said generator, variable resistive means in electrical circuit with said voltage source and said field for varying the strength of said field, a plurality of electrical motors, power operated parallel switches associated with one side of each motor and energizable by said voltage source to connect one side of said motors in parallel circuit relationship across said generator, manual switching means associated with the other side of each motor and connecting the other side of each motor to said generator, said switching means being operable upon opening thereof to disconnect said other side of the associated motor from said generator, said switching means being provided with contacting means operable upon opening of said switching means to prevent the power operating portion of the associated parallel switch from being energized by said voltage source and thereby placing said parallel switch for said associated motor in an inoperative condition and isolating said associated motor from said generator, said switching means being provided with other contacting means operable upon opening of said switching means to close a circuit containing said voltage source and the power operating portions of said parallel switches to thereby energize the remaining of said parallel switches and connect the remaining of said motors in parallel circuit relationship across said generator, and a current responsive relay responsive to predetermined values of current flow through said generator operable to connect a solenoid to said voltage source, said solenoid being operable to increase said variable resistive means in electrical circuit with said voltage source and said field to thereby decrease the field excitation for said generator and prevent its overload when one of said plurality of motors is isolated therefrom and the remaining of said motors are connected in parallel circuit relationship thereacross.

6. In a generating electric traction and control system for a locomotive, a generator having excitation means therefor, a plurality of electrical traction motors, switching means associated with one side of each of said traction motors and connecting said one side of said traction motors to said generator, parallel switches associated with the other side of each traction motor and operable to connect the other sides of said traction motors in parallel relationship to said generator, said switching means being manually operable to disconnect one side of the associated traction motors from said generator, said switching means having actuating means operable with said switching means to prevent closure of the parallel switch for the associated motor and thereby isolate said traction motor from said generator, said switching means having secondary actuating means operable with said switching means to close the remaining of said parallel switches thereby connecting the remaining of said traction motors in parallel circuit relationship across said generator, said secondary actuating means also being operable with said switching means to allow current responsive means responsive to the current in said generator to reduce the excitation means of said generator and thereby prevent overload of said generator when one of said motors is isolated therefrom and the remainder of said motors are connected in electrical parallel relationship thereacross.

7. In a generating electrical traction and control system for a locomotive, a generator including means to turn said generator, a voltage source, a field for said generator in electrical circuit with said voltage source, a variable resistor in electrical circuit with said voltage source and said field for varying the strength of said field, a plurality of electrical traction motors, power operated interlocks associated with one side of each traction motor and energizable by said voltage source to connect one side of said motors in parallel circuit relationship across said generator, a manually operated switch associated with the other side of each motor and having contacting means connecting the other side of each motor to said generator, each of said switches being operable to disconnect the other side of the associated traction motor from said generator, each of said switches being further provided with secondary contacting means operable with said switch to prevent the power operating portion of the associated power operated interlock from being energized by said voltage source and thereby placing the power operated interlock for said associated motor in an inoperative position and isolating said associated motor from said generator, each of said switches being further provided with other contacting means operable with said switches to close a circuit containing said voltage source and the power operating portions of said power operated interlocks to thereby energize the remaining of said power operated interlocks and connect the remaining of said motors in parallel circuit relationship across said generator, and a current responsive relay in electrical circuit with said generator and said motors and responsive to predetermined values of current flow through said generator operable to connect a solenoid to a circuit containing a cut-out relay which is operable to connect the circuit containing said solenoid to said voltage source, said cut-out relay being energizable by said voltage source through contacts operable with each of said switches, said solenoid being operable to increase the resistance of said variable resistor to thereby decrease the field excitation for said generator and prevent its overload when one of said plurality of motors is isolated therefrom and the remaining of said motors are connected in parallel circuit relationship thereacross.

8. A generator, a plurality of electrical motors in series parallel electrical circuit with said generator, and switching means associated with one side of one of said motors for disconnecting said one side from said generator, said switching means having additional switching means connected thereto and operable thereby upon opening of said first-mentioned switching means to connect the remaining of said plurality of motors in electrical parallel relationship across said generator.

9. A generator, four electrical motors connected in series parallel electrical relationship across said generator, switching means associated with one side of one of said motors for disconnecting said one side from said generator, means connected to said switching means and operable in response to opening of said switching means to connect the remaining three of said four motors in parallel electrical relationship across said generator thereby utilizing said remaining three motors without having unbalanced electrical power relations therebetween, generator current limiting means, and secondary means connected to said switching means and operable in response to opening of said switching means to activate said generator current limiting means and prevent overload of said generator with one motor disconnected therefrom and the remaining three motors connected in parallel relationship thereacross.

References Cited in the file of this patent

UNITED STATES PATENTS

| | | |
|---|---|---|
| 2,365,418 | Lillquist | Dec. 19, 1944 |
| 2,371,833 | Lillquist | Mar. 20, 1945 |
| 2,388,782 | Dilworth et al. | Nov. 13, 1945 |
| 2,449,399 | Lillquist | Sept. 14, 1948 |
| 2,516,198 | Frier | July 25, 1950 |
| 2,551,438 | Johnson | May 1, 1951 |

OTHER REFERENCES

"Controllers for Electric Motors," James and Markle (2nd ed.) McGraw-Hill Book Co., Inc., New York, 1952, pp. 44 and 285.